(12) United States Patent
Jefremov (10) Patent No.: US 9,509,618 B2
(45) Date of Patent: *Nov. 29, 2016

(54) METHOD OF TRANSMITTING DATA IN A COMMUNICATION SYSTEM

(75) Inventor: Andrei Jefremov, Janfalla (SE)

(73) Assignee: Skype, Dublin (IE)

( * ) Notice: Subject to any disclaimer, the term of this patent is extended or adjusted under 35 U.S.C. 154(b) by 322 days.

This patent is subject to a terminal disclaimer.

(21) Appl. No.: 13/022,478

(22) Filed: Feb. 7, 2011

(65) Prior Publication Data
US 2012/0033586 A1 Feb. 9, 2012

Related U.S. Application Data

(63) Continuation-in-part of application No. 12/887,236, filed on Sep. 21, 2010, now abandoned, which is a continuation of application No. 12/075,801, filed on Mar. 12, 2008, now Pat. No. 7,817,625.

(30) Foreign Application Priority Data

Mar. 13, 2007 (GB) .................................. 0704834.1

(51) Int. Cl.
| | |
|---|---|
| *H04L 12/28* | (2006.01) |
| *H04L 12/815* | (2013.01) |
| *H04L 12/825* | (2013.01) |
| *H04L 12/811* | (2013.01) |
| *H04L 12/26* | (2006.01) |

(52) U.S. Cl.
CPC ........... *H04L 47/22* (2013.01); *H04L 43/0894* (2013.01); *H04L 47/26* (2013.01); *H04L 47/263* (2013.01); *H04L 47/38* (2013.01); *H04L 43/0858* (2013.01)

(58) Field of Classification Search
None
See application file for complete search history.

(56) References Cited

U.S. PATENT DOCUMENTS 5,463,422 A 10/1995 Simpson et al.
5,687,095 A * 11/1997 Haskell et al. ............ 348/386.1
(Continued)

FOREIGN PATENT DOCUMENTS

CN 101658000 2/2010
EP 1 463 323 A1 9/2004
(Continued)

OTHER PUBLICATIONS

"Advisory Action", U.S. Appl. No. 12/402,161, (May 23, 2011), 3 pages.
(Continued)

*Primary Examiner* — Michael J Moore, Jr.
(74) *Attorney, Agent, or Firm* — Tom Wong; Micky Minhas (57) ABSTRACT

A method, terminal and program, the method comprising: at a second terminal, receiving a first signal transmitted from a first terminal via a communication network; transmitting a second signal from the second terminal to the first terminal; outputting the first signal from an output device associated with the second terminal; determining a balance between a characteristic of the first signal and a characteristic of the second signal, wherein the characteristics affect a processing resource required to process the first and second signals, the determined balance comprising a decision concerning the characteristic of the first signal; and sending the decision to the first terminal so as to advise the first terminal to adjust the characteristic of the first signal as transmitted from the first terminal.

28 Claims, 6 Drawing Sheets

(56) References Cited

U.S. PATENT DOCUMENTS

| | | | |
|---|---|---|---|
| 5,768,527 A | | 6/1998 | Zhu et al. |
| 5,838,664 A | * | 11/1998 | Polomski ............... 370/263 |
| 6,067,534 A | | 5/2000 | Terho et al. |
| 6,141,565 A | | 10/2000 | Feuerstein et al. |
| 6,175,856 B1 | | 1/2001 | Riddle |
| 6,356,283 B1 | | 3/2002 | Guedalia |
| 6,748,220 B1 | * | 6/2004 | Chow ............... H04W 72/08 455/450 |
| 7,047,305 B1 | | 5/2006 | Brooks et al. |
| 7,587,454 B2 | * | 9/2009 | Shabtai ............ H04L 29/06027 348/153 |
| 7,898,950 B2 | * | 3/2011 | Barkley et al. ............ 370/230.1 |
| 7,925,721 B2 | * | 4/2011 | Ro ............... G06F 17/30905 709/220 |
| 7,948,886 B2 | * | 5/2011 | Chakareski et al. ......... 370/231 |
| 8,018,850 B2 | * | 9/2011 | van Beek ........... H04N 21/2365 370/232 |
| 8,059,634 B1 | | 11/2011 | Evans |
| 8,289,370 B2 | * | 10/2012 | Civanlar et al. ........... 348/14.12 |
| 2002/0073238 A1 | | 6/2002 | Doron |
| 2002/0136164 A1 | | 9/2002 | Fukuda et al. |
| 2002/0141392 A1 | | 10/2002 | Tezuka et al. |
| 2002/0165966 A1 | * | 11/2002 | Widegren et al. ............ 709/226 |
| 2003/0152032 A1 | | 8/2003 | Yanagihara et al. |
| 2003/0236833 A1 | * | 12/2003 | Glitho et al. ................. 709/204 |
| 2003/0236892 A1 | | 12/2003 | Coulombe |
| 2004/0032485 A1 | | 2/2004 | Stephens, Jr. |
| 2004/0107245 A1 | | 6/2004 | Bodnar |
| 2004/0113933 A1 | | 6/2004 | Guler |
| 2004/0133701 A1 | | 7/2004 | Karaoguz et al. |
| 2004/0203976 A1 | | 10/2004 | Gupta et al. |
| 2004/0253991 A1 | | 12/2004 | Azuma |
| 2004/0264803 A1 | * | 12/2004 | Castillo ............... 382/276 |
| 2004/0266442 A1 | | 12/2004 | Flanagan et al. |
| 2005/0018768 A1 | | 1/2005 | Mabey et al. |
| 2005/0073575 A1 | | 4/2005 | Thacher et al. |
| 2005/0273491 A1 | | 12/2005 | Meyer et al. |
| 2006/0064647 A1 | | 3/2006 | Tapuska et al. |
| 2006/0079209 A1 | | 4/2006 | Oda |
| 2006/0139371 A1 | | 6/2006 | Lavine et al. |
| 2006/0146711 A1 | | 7/2006 | Anbarani |
| 2006/0227781 A1 | | 10/2006 | Marce et al. |
| 2007/0002840 A1 | | 1/2007 | Song et al. |
| 2007/0019587 A1 | | 1/2007 | Okamoto et al. |
| 2007/0027983 A1 | * | 2/2007 | Bowra ............... G06F 9/50 709/224 |
| 2007/0174489 A1 | | 7/2007 | Iwabuchi |
| 2007/0174881 A1 | | 7/2007 | Idehara et al. |
| 2007/0206591 A1 | | 9/2007 | Doviak et al. |
| 2007/0206635 A1 | | 9/2007 | Pozhenko et al. |
| 2007/0271358 A1 | | 11/2007 | Gaddy |
| 2008/0068446 A1 | | 3/2008 | Barkley et al. |
| 2008/0165895 A1 | | 7/2008 | Lesser et al. |
| 2008/0225750 A1 | | 9/2008 | Jefremov |
| 2008/0225844 A1 | | 9/2008 | Jefremov |
| 2008/0298444 A1 | | 12/2008 | Cioffi et al. |
| 2009/0234919 A1 | | 9/2009 | Jefremov et al. |
| 2009/0310487 A1 | * | 12/2009 | Eriksson ............... H04L 47/10 370/235 |
| 2011/0122869 A1 | | 5/2011 | Jefremov |
| 2012/0033586 A1 | | 2/2012 | Jefremov |

FOREIGN PATENT DOCUMENTS

| | | |
|---|---|---|
| EP | 2272237 | 1/2012 |
| EP | 2445168 | 4/2012 |
| GB | 2405768 | 9/2005 |
| JP | 11215481 A | 8/1999 |
| JP | 2010521856 | 6/2010 |
| WO | WO 97/22201 A | 6/1997 |
| WO | WO 2005/002261 A1 | 1/2005 |
| WO | WO 2005/009019 A2 | 1/2005 |
| WO | WO 2008/027724 A1 | 3/2008 |
| WO | WO-2008110871 | 9/2008 |
| WO | WO-2008110930 | 9/2008 |
| WO | WO-2009112547 | 9/2009 |

OTHER PUBLICATIONS

"European Search Report", Application No. EP11196071, (Mar. 23, 2012), 7 pages.

"Final Office Action", U.S. Appl. No. 12/004,457, (Mar. 1, 2012), 29 pages.

"Final Office Action", U.S. Appl. No. 12/402,161, (Mar. 9, 2011), 26 pages.

"Non-Final Office Action", U.S. Appl. No. 12/004,457, (Aug. 1, 2011), 21 pages.

"Non-Final Office Action", U.S. Appl. No. 12/402,161, (Sep. 28, 2010), 25 pages.

"Written Opinion", Application No. PCT/IB2008/001353, (Sep. 12, 2008), 8 pages.

"Foreign Office Action", CN Application No. 200880008101.6, (Jun. 4, 2012), 7 pages.

"Foreign Office Action", EP Application No. 08751054.1, (Mar. 1, 2012), 6 pages.

"Foreign Office Action", EP Application No. 08751054.1, (Jun. 9, 2010), 7 pages.

"Foreign Office Action", JP Application No. 2009-553236, (Feb. 21, 2012), 7 pages.

Sato, et al., "Compressed Video Transmission Protocol Considering Dynamic QoS Control," *Architecture and OS Support for Multimedia Applications/Flexible Communication Systems/Wireless Networks and Mobile Computing*, 1998 ICPP Workshops; pp. 95-104 (Jan. 1998).

International Search Report and Written Opinion for International Application No. PCT/IB32007/004510, date of mailing Sep. 5, 2008.

Notification of Transmittal of the International Search Report and the Written Opinion of the International Searching Authority, or the Declaration, PCT/EP2009/052916, 14 pp., mailed Jul. 10, 2009.

International Search Report, PCT/IB2008/001353, 4 pp., mailed Sep. 12, 2008.

Office Action, dated Dec. 1, 2009, U.S. Appl. No. 12/075,081.

Notice of Allowance, dated Jun. 22, 2010, U.S. Appl. No. 12/075,081.

"Non-Final Office Action", U.S. Appl. No. 12/402,161, (Jun. 10, 2013), 26 pages.

"Foreign Office Action", CN Application No. 200880008101.6, Mar. 28, 2014, 14 pages.

"Non-Final Office Action", U.S. Appl. No. 12/004,457, Aug. 27, 2014, 32 pages.

"Reexamination Decision", CN Application No. 200880008101.6, Dec. 4, 2014, 18 pages.

"Final Office Action", U.S. Appl. No. 12/402,161, Dec. 11, 2015, 22 pages.

"Final Office Action", U.S. Appl. No. 12/402,161, Dec. 31, 2013, 21 pages.

"Non-Final Office Action", U.S. App. No. 12/402,161, Mar. 18, 2015, 24 pages.

"Final Office Action", U.S. Appl. No. 12/004,457, Apr. 1, 2015, 32 pages.

"Non-Final Office Action", U.S. Appl. No. 12/004,457, May 12, 2016, 31 pages.

* cited by examiner

METHOD OF TRANSMITTING DATA IN A COMMUNICATION SYSTEM

RELATED APPLICATIONS

This application is a continuation-in-part of U.S. application Ser. No. 12/887,236, filed Sep. 21, 2010 now abandoned, which is a continuation of U.S. application Ser. No. 12/075,801, filed Mar. 12, 2008 now U.S. Pat No. 7,817,625, which claims priority under 35 U.S.C. §119 or 365 to Great Britain Application No. 0704834.1, filed Mar. 13, 2007.

The entire teachings of the above applications are incorporated herein by reference.

FIELD OF THE INVENTION

The present invention relates to information processing systems such as communication systems. More particularly the present invention relates to a method and apparatus for receiving and transmitting information in a communication system.

BACKGROUND

In a communication system a communication network is provided, which can link together two communication terminals so that the terminals can send information to each other in a call or other communication event. Information may include speech, text, images or video.

Modern communication systems are based on the transmission of digital signals Analogue information such as speech is input into an analogue to digital converter at the transmitter of one terminal and converted into a digital signal. The digital signal is then encoded and placed in data packets for transmission over a channel to the receiver of another terminal.

Each data packet includes a header portion and a payload portion. The header portion of the data packet contains data for transmitting and processing the data packet. This information may include an identification number and source address that uniquely identifies the packet, a header checksum used to detect processing errors and the destination address. The payload portion of the data packet includes information from the digital signal intended for transmission. This information may be included in the payload as encoded frames such as video frames, wherein each frame represents a portion of the video signal.

One type of communication network suitable for transmitting data packets is the internet. Protocols which are used to carry voice signals over an Internet Protocol network are commonly referred to as Voice over IP (VoIP). VoIP is the routing of voice conversations over the Internet or through any other IP-based network.

Conditions associated with the communication system, such as resource availability of communication terminals can affect the ability of the terminals to process data. For example, CPU (central processing unit) resources will affect how effectively the transmitting and receiving terminals can process information.

It is therefore necessary to optimise the manner in which information is processed and transmitted by the terminals in accordance with the conditions associated with the communication system.

In a known solution a receiving terminal may report to the transmitting terminal the CPU resource of the receiving terminal that is available to process the information received from the transmitting terminal. The transmitting terminal may then adjust the rate at which data is transmitted to the receiving terminal in dependence on the available CPU resource of the receiving terminal.

However during a two way communication event such as a video call, where each terminal transmits and receives video data, the users of each terminal may find that they experience a different quality of service during the call. For example, whilst one terminal receives a high quality signal the other terminal may receive a low quality signal. This is disadvantageous for both participants of the call since the call is likely to be terminated if even one participant of the call experiences poor call quality.

It is also known to include an "Offer-Answer" model in an internet protocol, whereby a receiving terminal can send back a request to a transmitting terminal requesting a certain bitrate signal. This allows the receiving terminal to negotiate the streaming it receives. However, the current standard is centred only around one-way transmission and does not specify how the requested bitrate is to be determined. Hence if used during a two-way communication such as a voice or video call then the current model will in fact treat the two signals of the call (from first to second terminal and vice-versa) as two completely separate one-way communications, i.e. so the two streams of the call will be negotiated separately.

It is an aim of the present invention to achieve a balanced quality of service among the participants of a communication event and to overcome the above identified problems.

SUMMARY

According to one aspect of the present invention, systems and methods are provided for transmitting data in a communications network. A second terminal receives a first signal transmitted from a first terminal via a communication network. A second signal is transmitted from the second terminal to the first terminal. An output device associated with the second terminal outputs the first signal. A balance is determined between a characteristic of the first signal and a characteristic of the second signal, wherein the characteristics affect a processing resource required to process the first and second signals, the determined balance includes a decision concerning the characteristic of the first signal. The decision is sent to the first terminal so as to advise the first terminal to adjust the characteristic of the first signal as transmitted from the first terminal.

For example, if caller A is engaged in a call with caller B, caller B can make decisions about what signal it is going to send to caller A and at the same time it will make decisions about what signal it wants caller A to send. The request concerning the type of signal that caller B wants caller A to send will be transmitted to caller A and then caller A can commence transmission using the signal characteristics defined in the request sent by caller B.

In embodiments, the decision may be determined at the second terminal. The decision may be transmitted from the second terminal to the first terminal.

The decision may be determined at a third, host terminal, being a terminal other than said first and second terminals and a host of a conference call in which the first, second and third terminals are participants. The decision may be transmitted from the third terminal to the first terminal.

The decision may be determined at a server, which is a node of the network other than the first and second terminals. The decision may be transmitted from the second terminal to the first terminal.

In determining the decision, a processing resource of the second terminal that is used to receive the first signal may be determined. In determining the decision, an estimate of a processing resource of the second terminal used to transmit the second signal may be determined.

The decision concerning the transmission of the second signal may be based on the estimates of the processing resource used to receive the first signal and the estimates of the processing resource used to transmit the second signal together.

The determination of the balance may take into account an estimation of a processing resource of the first terminal used to transmit the first signal.

The determination of the balance may take into account an estimation of a processing resource of the first terminal used to receive the second signal.

The first and second terminals may be participants of a conference call. The determination of the balance may take into account a processing resource of at least one other participating terminal of the conference call used to participate in the conference call.

The characteristic of the first signal may include at least one or more of: frame rate, bit rate, frame resolution. The characteristic of the second signal may include at least one of: frame rate, bit rate, frame resolution.

The processing resource to process the first signal may include a processing resource to decode the first signal at the second terminal. The processing resource to process the second signal may include a processing resource to encode the second signal at the second terminal.

The first signal may be received and the second signal may be transmitted as part of a same communication event.

The first and second signal may be part of a voice or video call between the first and second terminals.

The communication network may be the internet. The first signal may be received by the second signal from the first terminal via the internet. The second signal may be transmitted from the second terminal to the first terminal via the internet. The decision may be sent to the first terminal via the internet.

According to another aspect of the present invention, a first signal from a first terminal may be received from a second terminal via a communication network. A second signal may be transmitted from the second terminal to the first terminal. The first signal may be output from an output device associated with the second terminal. A processing resource of the second terminal used to receive the first signal may be estimated. A processing resource of the second terminal used to transmit the second signal may be estimated. A decision concerning a transmission quality of the first signal may be determined by the second terminal based on the estimates of the both the processing resource used to receive the first signal and the processing resource used to transmit the second signal together. The decision may be sent to the first terminal so as to advise the first terminal to transmit the first signal with said transmission quality.

According to another aspect of the present invention, receiving circuitry may be provided that is arranged to receive a first signal transmitted from a first terminal via a communication network. Transmitting circuitry may be provided that is arranged to transmit a second signal from the second terminal to the first terminal. An output device may be provided that is arranged to output the first signal. A resource manager may be provided that is arranged to determine a balance between a characteristic of the first signal and a characteristic of the second signal. The characteristics affect a processing resource required to process the first and second signals. The determined balance may include a decision concerning the characteristic of the first signal. The transmitting circuitry may be arranged to send the decision to the first terminal so as to advise the first terminal to adjust the characteristic of the first signal as transmitted from the first terminal.

According to another aspect of the present invention, a second terminal is provided. The second terminal may include receiving circuitry that is arranged to receive a first signal from a first terminal via a communication network. The second terminal may include transmitting circuitry that is arranged to transmit a second signal from the second terminal to the first terminal. The second terminal may include an output device arranged to output the first signal. The second terminal may include a resource manager that is configured to estimate a processing resource of the second terminal used to receive the first signal, and to estimate a processing resource of the second terminal used to transmit the second signal. The resource manager may further be configured, based on the estimates of the both the processing resource used to receive the first signal and the processing resource used to transmit the second signal together, to thereby determine a decision concerning a transmission quality of the first signal. The transmitting circuitry may be arranged to send the decision to the first terminal so as to advise the first terminal to transmit the first signal with said transmission quality.

According to another aspect of the present invention there is provided a method of transmitting a first signal from a first terminal to a second terminal via a communication network comprising: receiving at the first terminal a second signal from the second terminal; outputting the second signal from an output device associated with the first terminal; determining information relating to a characteristic of the second signal; estimating a processing resource of the second terminal used to transmit the second signal, wherein the estimation is based on the information relating to the characteristic of the second signal; adjusting a characteristic of the first signal in dependence on the estimated processing resource of the second terminal used to transmit the second signal; and transmitting the first signal to the second terminal.

Another aspect of the invention provides a method of transmitting a first signal from a first terminal to each of a plurality of second terminals via a communication network comprising: receiving at the first terminal a second signal from each of said second terminals; determining information relating to a characteristic of each of said second signals; estimating a processing resource of each second terminal used to transmit each second signal, wherein the estimation is based on the information relating to the characteristic of each of said second signals; adjusting a characteristic of the first signal transmitted to each second terminal in dependence on the estimated processing resource of each second terminal used to transmit each second signal; and transmitting each first signal to each second terminal.

Another aspect of the invention also provides a first terminal arranged to transmit a first signal to a second terminal via a communication network, said first terminal comprising: receiving circuitry arranged to receive a second signal from the second terminal; an output device arranged to output the second signal; a resource manager arranged to determine information relating to a characteristic of the second signal, to estimate a processing resource of the second terminal used to transmit the second signal, wherein the estimation is based on the information relating to the characteristic of the second signal and to adjust a characteristic of the first signal in dependence on the estimated processing resource of the second terminal used to transmit the second signal; and transmitting circuitry arranged to transmit the first signal to the second terminal.

Another aspect of the invention also provides a first terminal arranged to transmit a first signal to each of a plurality of second terminals via a communication network comprising: receiving circuitry arranged to receive a second signal from each of said second terminals; a resource manager arranged to determine information relating to a characteristic of each of said second signals, to estimate a processing resource of each second terminal used to transmit each second signal, wherein the estimation is based on the information relating to the characteristic of each of said second signals, and to adjust a characteristic of the first signal transmitted to each second terminal in dependence on the estimated processing resource of each second terminal used to transmit each second signal; and transmitting circuitry arranged to transmit each first signal to each second terminal.

The invention also provides a computer program product for implementing the above-defined methods.

Embodiments of the invention allow information relating to characteristics to be gathered in one place so that a decision concerning signal transmission characteristics can be made for all participants, not just to allow the host to adjust his signal transmission characteristics. That is, the host can advise participants of the signal they should send. That is, if information concerning signal characteristics is gathered in one place, it is possible to have a much better overview of what is happening in the conference and to make better decisions about required signal transmission characteristics for all participants. This does not add significantly to the transmission overhead, because the information relating to characteristics does not constitute a large amount of data. This concept can be utilised not only in conference calls, but also for one-to-one calls.

As mentioned, if a first, near-end terminal A is engaged in a call or other communication with a second, far-end terminal B, then the second terminal may make decisions about what signal it is going to send to the first terminal and at the same time it may make decisions about what signal it wants the first terminal to send. The request concerning the type of signal that the second terminal wants the first terminal to send may be transmitted to the first terminal and then the first terminal may commence transmission using the signal characteristics defined in the request sent by the second terminal.

According to one aspect of the invention, the decision may be based on determining a balance between the signals transmitted and received by the second terminal to and from the first terminal. I.e. the decision may be based on a balance between, on the one hand, the processing resources used to by the second terminal to transmit, and on the other hand, the processing resources used by the second terminal receive to and from the first terminal. The decision may determined at the second terminal, and the decision then fed back from the second terminal to the first terminal so as to control the transmission of the signal being received from the first terminal. This enables the second terminal to control what is transmitted based on what is received, or vice versa For example, suppose the second terminal finds that it is currently committing a large number of CPU cycles per unit time to receiving a very high bitrate signal from the first terminal (e.g. due to the processing cost of decoding the high rate signal), leaving only a small number of cycles available to generate the return signal for transmission to the first terminal (e.g. leaving only enough resource to encode a low rate). This may mean that the second terminal is receiving a needlessly burdensome signal whilst the first terminal is only provided with an undesirably low quality signal. In this case the second terminal may determine that it would be preferable for the first terminal to stop sending such a high bitrate signal, and feed back a request indicating such to the first terminal. The first terminal would then act on the request to transmit a reduced bitrate signal (e.g. lower resolution or frame rate or otherwise using an encoding algorithm that applies more compression). Thus the invention may achieve a more balanced experience for the users of first and second terminals.

Unlike the existing solution whereby a receiving terminal may report its available CPU resources to the transmitting terminal, according to this aspect of the present invention the balancing decision may be performed entirely at the second terminal and only the decision is fed back to the first terminal, not the actual measure of CPU resource. One technical consequence of this for internet communications and potentially other networks is that a standard protocol for requesting a certain bitrate or quality of signal already exists, e.g. in the form of the Offer-Answer model, so no modification to the existing protocol need necessarily be involved; whereas reporting CPU resources would require a special custom protocol to be implemented.

However, unlike current standards, this aspect of the present invention also provides an improved mechanism for determining the decision about what bitrate or quality signal should be requested. As described above, the existing model is centred only around one-way transmission and does not specify how the requested bitrate is to be determined. Hence if used during a two-way communication such as a voice or video call then the current model will in fact treat the two signals of the call (from first to second terminal and vice-versa) as two completely separate one-way communications. That is, the existing model simply assumes two independent one-way communications and negotiates them separately. In contrast with aspects of the present invention, a standard request for a required bitrate will not take into account how much processing power is used to both receive and transmit. That is, the decision regarding the signal received in one direction is not based on an appreciation of the signal transmitted in the other direction; whereas the decision according to the present invention operates on the basis that due to limitations on processing resources, the receipt of a first signal in one direction can have an effect on the transmission of a second signal in the other direction.

Further, according to one aspect of the present invention, note that the decision about the signal the second terminal would like to receive is performed at the second terminal itself, i.e. the balancing algorithm is run at the far end terminal form the perspective of the first terminal. This is as opposed to an alternative aspect of the invention, which relies on sending information relating to signal characteristics from the second terminal to the first terminal and making the determination about what to transmit to the second terminal at the first terminal. Again, one consequence of the former case is that a standard protocol for requesting a certain bitrate or quality of signal already exists, e.g. in the form of the Offer-Answer model, so no modification to the existing protocol need necessarily be involved; whereas in the latter case a special custom protocol to be implemented.

In another alternative, the balancing decision could be performed at a server (although that would involve more custom data).

BRIEF DESCRIPTION OF THE DRAWINGS

For a better understanding of the present invention and to show how the same may be carried into effect, embodiments of the present invention will now be described with reference to the following drawings.

DETAILED DESCRIPTION

Figure 1:
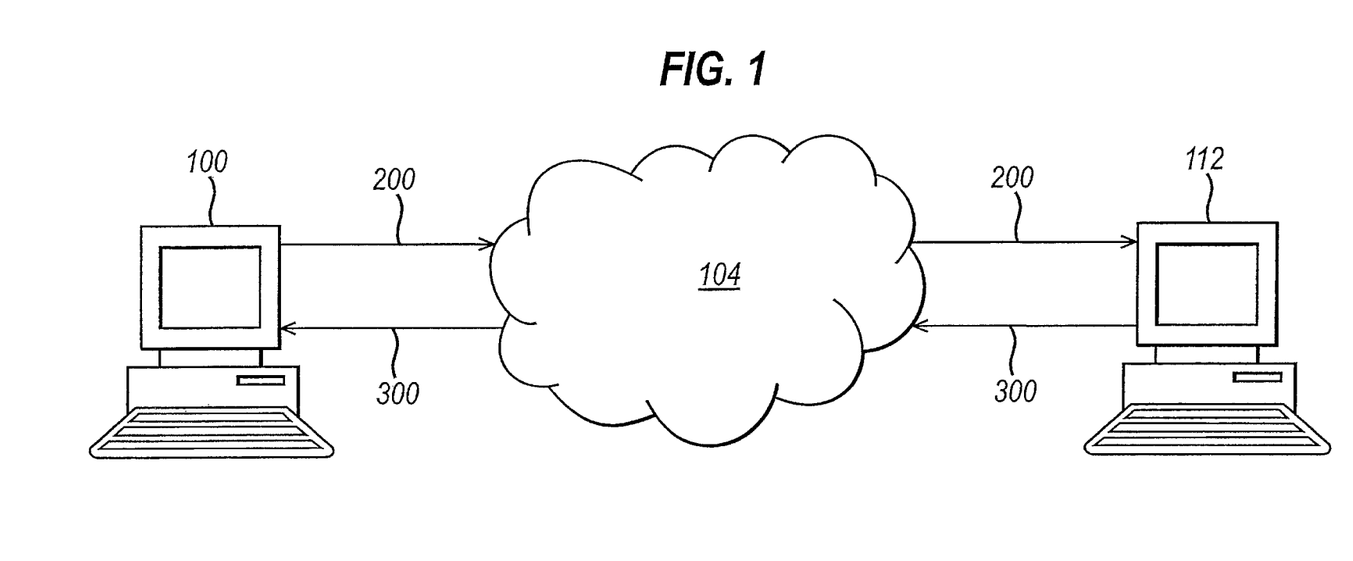
FIG. 1 shows a communication network.

Reference will first be made to FIG. 1, which shows a first terminal 100 and a second terminal 112 connected to a communication network 104. The terminals are arranged to transmit data, such as a media signal comprising audio data and video data, to each other via the communication network 104. In one embodiment of the invention the communications network is a VoIP network provided by the Internet. It should be appreciated that even though the exemplifying communications system shown and described in more detail herein uses the terminology of a VoIP network, embodiments of the present invention can be used in any other suitable communication system that facilitates the transfer of data.

The terminals 100 and 112 may be, for example, a personal computer, a gaming device, a personal digital assistant, a suitably enabled mobile phone, a television or other device able to connect to the network 104. The terminals may be connected to the network via a wired or wireless connection that employs a particular access technology such as Ethernet, WiFi, WiMax (Worldwide Interoperability for Microwave Access), 3G (third generation), As shown in FIG. 1 the first terminal 100 transmits a signal 200 to the second terminal 112. The second terminal is arranged to transmit a signal 300 to the first terminal 100. The signal 300 transmitted from the second terminal to the first terminal will hereinafter be referred to as the reply signal 300 in order to clearly distinguish between the two signals. It should therefore be appreciated that term reply signal 300 is used only to indicate the direction in which the signal is transmitted and is not limited to occurring within the same communication event or at the same time as the signal 200.

Figure 2:
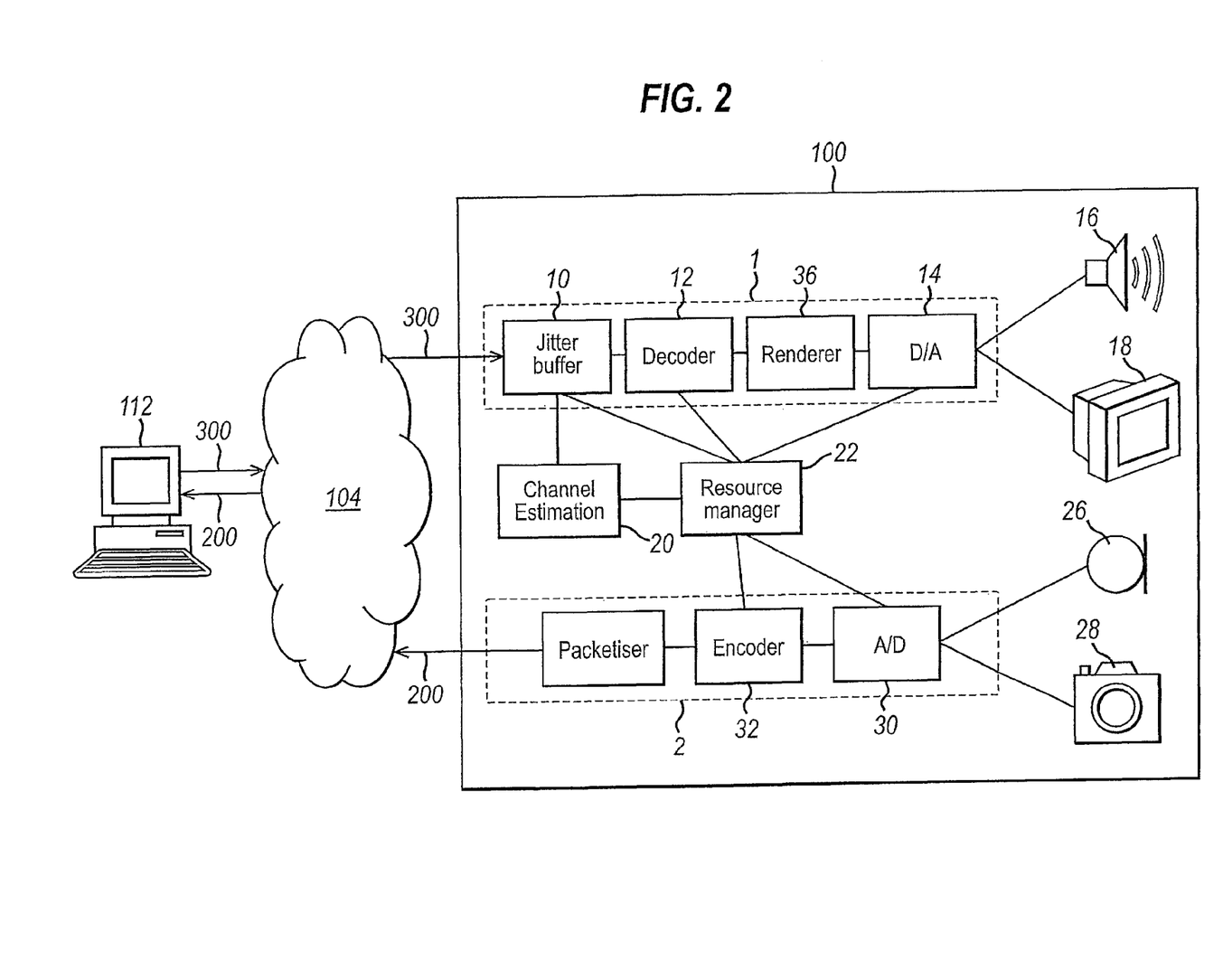
FIG. 2 shows a first terminal according to an embodiment of the invention.

Reference will now be made to FIG. 2. FIG. 2 shows the first terminal 100 in detail. The first terminal 100 includes receiving circuitry 1 for receiving data transmitted via the network 104 and transmitting circuitry 2 for transmitting data via the network 104. It should be appreciated that the second terminal 112 may also comprise similar transmitting and receiving circuitry.

The transmitting circuitry of the terminal 100 is arranged to receive data input from input devices such as a microphone 26 and a webcam 28 and to transmit the data in the signal 200 to the second terminal 112 via the network 104. The transmitting circuitry comprises an analogue to digital converter 30 for converting analogue data input from an analogue input device into digital information, an encoder 32 for encoding the digital information into encoded data frames and a packetiser 42 for placing the encoded data frames data in packets before transmitting the data.

The receiving circuitry is arranged to output data received in the reply signal 300 from the second terminal 112 to various output devices such as a loudspeaker 16 and a display screen 18. The receiving circuitry comprises a jitter buffer 10 for buffering data packets received from the network, a decoder 12 for decoding the data received in the data packets, a renderer block 36 for handling video data to be output to the display screen 18 and a digital to analogue converter 14 for outputting analogue data to analogue output devices.

The terminal 100 also includes a channel estimation unit 20 and a resource manager block 22.

The channel estimation unit 20 is arranged to receive an input from the receiving circuitry. The channel estimation unit 20 is arranged to determine characteristics of the data received via the network 104. When the second terminal 112 transmits a reply signal 300 to the first terminal 100 the channel estimation unit is arranged to determine characteristics of the reply signal 300. In accordance with an embodiment of the invention the channel estimation unit is arranged to determine characteristics of the reply signal 300 from which the CPU resource availability of the second terminal can be estimated.

The characteristics of the reply signal determined by the channel estimation unit may include for example the frame rate or the bit rate of the signal. The characteristics of the reply signal 300 are then input into the resource manager block 22.

In accordance with an embodiment of the invention the resource manager block 22 of the terminal 100 is arranged to estimate the CPU resources of the second terminal 112 used to transmit the reply signal based on the characteristics of the reply signal 300, and to adjust the characteristics of the signal 200 transmitted to the second terminal accordingly. For example the resource manager may be arranged to determine that the CPU resources of the second terminal are low if the frame rate of the reply signal is below a threshold value. If it is determined that the CPU resources of the second terminal 112 are low, the data rate of the signal 200 transmitted from the first terminal to the second terminal will be reduced to below a threshold value to ensure that the signal 200 does not overload the resources of the second terminal. Furthermore, this allows the second terminal to increase the CPU resources allocated to transmitting the reply signal to the first terminal 100.

If however it is determined that the CPU resources of the second terminal are high the frame rate of the signal 200 may be increased to above a threshold value. This forces the second terminal to allocate greater CPU resource to processing the received signal 200 and may reduce the CPU resource available for transmitting the reply signal 300 to the first terminal.

Characteristics of the reply signal 300 and the signal 200 that may be determined and adjusted according to embodiments of the invention include but are not limited to the frame rate of the signal, the bit rate of the signal and the resolution of each frame in the signal. Whilst embodiments of the invention describe adjusting the frame rate of the signal, it should be appreciated that any characteristic that affects the CPU requirement to process the signal may be adjusted according to embodiments of the present invention.

In accordance with a further embodiment of the invention the characteristics of the reply signal 300 transmitted from the second terminal may be reported by the second terminal 112. As such the first terminal is not required to estimate the characteristics of the received reply signal 300. In this case the second terminal 112 may be arranged to report the frame rate of the reply signal 300 transmitted to the first terminal 100. This will be explained with reference to FIG. 3.

Figure 3:
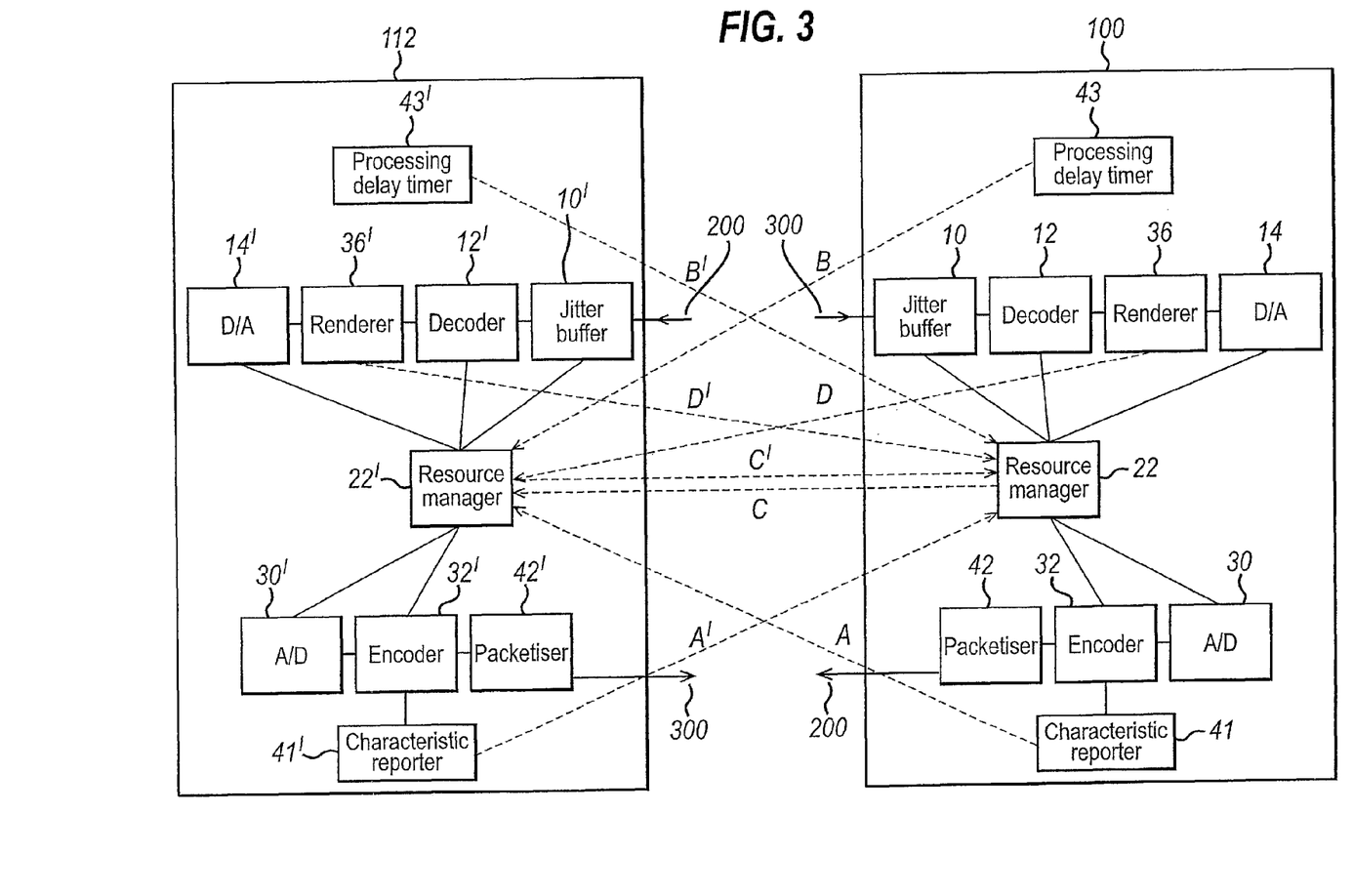
FIG. 3 shows a first and second terminal according to an embodiment of the invention.

FIG. 3 shows the first terminal 100 and the second terminal 112 in detail.

As shown in FIG. 3 the second terminal comprises a characteristic reporter unit 41'. The characteristic reporter unit 41' is arranged report characteristics of the reply signal 300 to the first terminal. In one embodiment of the invention the characteristic reporter unit 41' is arranged to determine the rate at which frames are output from the encoder 32' of the second terminal and to report the frame rate as a value A'. The frame rate value A' may be encoded with the data transmitted in the reply signal before it is inserted into a data packet by the packetiser 42' and transmitted in a data packet to the first terminal 100. Alternatively the value A' may be reported in a separate logical control channel.

The data packet is received and decoded by the receiving circuitry of the first terminal 100. The decoded frame rate value A' is input into the resource manager 22. The resource manager is arranged to estimate the CPU resource of the second terminal 112 using the frame rate value A', and to control the frame rate of the signal 200 transmitted to the second terminal in dependence of the estimated CPU resource.

Similarly the first terminal may also comprise a characteristic reporter unit 41 arranged to report characteristics of the signal 200 to the second terminal 122. In one embodiment of the invention the characteristic reporter unit 41 may be arranged to report the rate at which frames are output from the encoder 32. The frame rate value A of the signal 200 may be reported to the resource manager 22' of the second terminal 112. The resource manager 22' of the second terminal may then estimate the CPU resource of the first terminal using the frame rate value A and control the frame rate of the signal transmitted to the first terminal in dependence on the estimated CPU resource.

In a further embodiment of the invention, information on the rate at which the receiving circuitry 1' of the second terminal 112 is able to process the signal 200 transmitted from the first terminal 100 may be used together with the characteristics of the reply signal 300 transmitted from second terminal to adjust a characteristic of the signal 200. This will be explained with reference again to FIG. 3.

As shown in FIG. 3, the second terminal 112 may also comprise a processing delay timer 43'. The processing delay timer 43' is arranged to determine the time taken for a packet of the signal 200 received from the first terminal to be processed by the receiving circuitry 1'. The processing delay timer 43' may be arranged to measure the time between when a packet of the signal 200 arrives at the jitter buffer 10' and when frames from the packet are output from the renderer 36'. The processing delay timer may then determine how many frames per second the receiving circuitry may process.

The number of frames per second that the receiving circuitry 1' can process is reported as a value B' to the first terminal. The number of frames per second B' may be encoded and transmitted from the second terminal 112 to the first terminal together with the reply signal 300.

The value B' representing the number of frames per second that the receiving circuitry 1' of the second terminal can process is input into the resource manager 22 of the first terminal 100.

In accordance with an embodiment of the invention the resource manager 22 of the first terminal 100 is arranged to compare the value B' representing the number of frames per second that the receiving circuitry 1' of the second terminal can process, with the value A' representing the frame rate of the reply signal 300 in order to determine whether the data rate of the signal 200 should be adjusted. This will be described with reference to FIG. 4.

Figure 4:
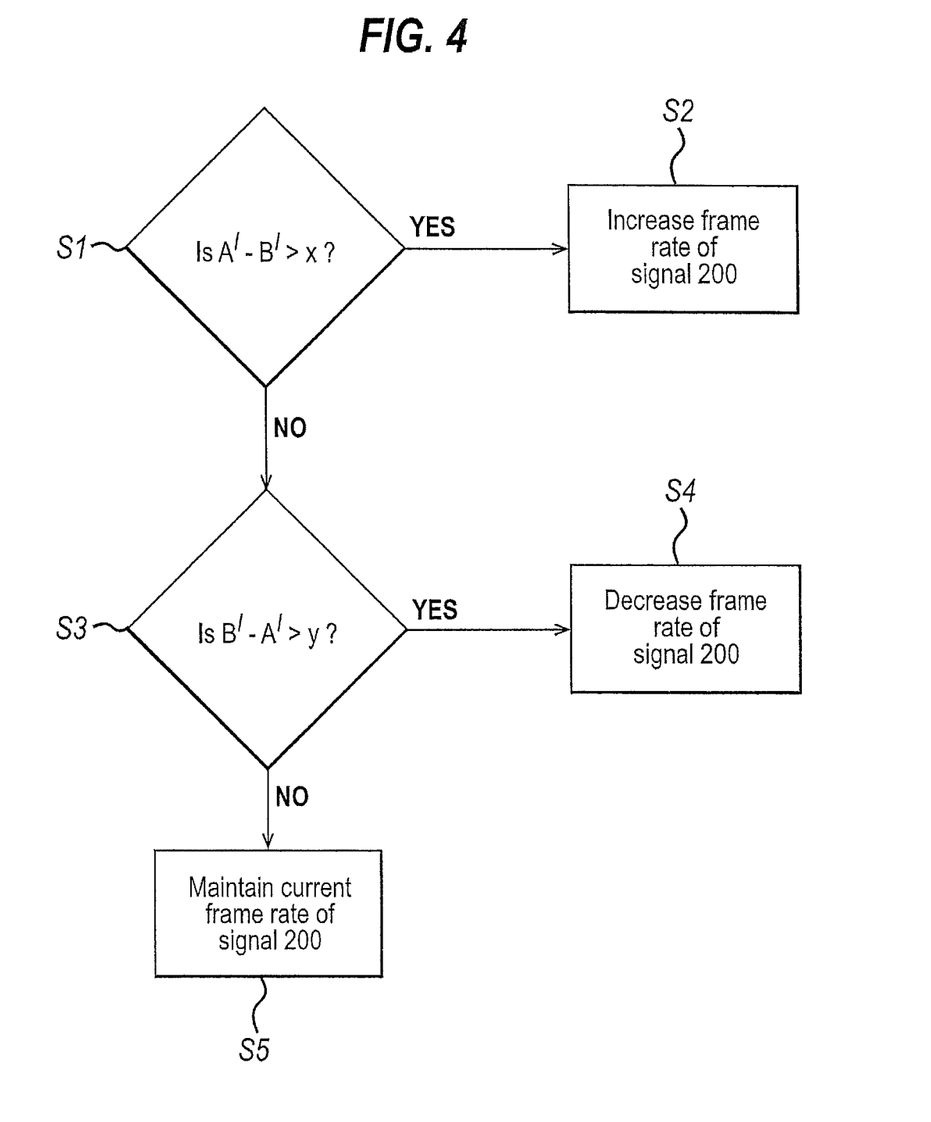
FIG. 4 is a flow chart illustrating a method according to an embodiment of the present invention.

As shown in FIG. 4, in step S1 it is determined if the value of A' is greater than the value B' by more than a predetermined amount x.

If the value of A' is greater than the value B' by more than the predetermined amount x, the method continues to step S2.

In step S2 the resource manager 22 of the first terminal is arranged to instruct the encoder 32 to increase the frame rate of the signal 200 transmitted to the second terminal, thus forcing the resource manager 22' of the second terminal 112 to allocate greater CPU resources for processing the signal 200 and to reduce the CPU resources for transmitting the reply signal 300.

If the value of A' is not greater than the value B' by the predetermined amount x, the method continues to step S3.

In step S3 it is determined if the value of B' is greater than the value A' by more than a predetermined amount y.

If the value of B' is greater than the value A' by more than the predetermined amount y, the method continues to step S4.

In step S4 the resource manager 22 of the first terminal is arranged to instruct the encoder 32 to decrease the frame rate of the signal 200 transmitted to the second terminal, thus reducing the CPU resources required to process the signal 200 and allowing the resource manager of the second terminal to allocate greater CPU resources to transmitting the reply signal 300.

If the value of A' is less than the value B' by less than the predetermined amount y, the method continues to step S5.

In step S5 the resource manager 22 of the first terminal is arranged to maintain the current frame rate of the signal 200.

Similarly a processing delay timer 43 may be provided in the first terminal 100. The processing delay timer 43 of the first terminal may be arranged to report to the number of frames per second that the receiving circuitry 1 can process. The resource manager 22' of the second terminal may then adjust the frame rate of the reply signal 300 according to the method described with reference to FIG. 4.

According to a further embodiment of the invention, information on the available CPU resource of the second terminal 112 may be used together with the characteristics of the reply signal 300 to adjust the frame rate of the signal 200. This will be explained with reference again to FIG. 3.

The resource manager 22' of the second terminal 112 may be arranged to report the available CPU resource to the first terminal. If the available CPU resource of the second terminal is greater than a threshold value the resource manager 22' of the second terminal is arranged to report to the first terminal that the available CPU resource is high. Conversely, if the available CPU resource of the second terminal is below a threshold value the resource manager 22' of the second terminal is arranged to report to the first terminal that the available CPU resource is low.

A value C' reporting whether the available CPU resource of the second terminal is high or low is encoded and transmitted together with the reply signal 300 to the first terminal.

At the first terminal the value C' reporting the available CPU resource of the second terminal is input into the resource manager 22 of the first terminal.

In accordance with an embodiment of the invention the resource manager 22 of the first terminal 100 is arranged to adjust the data rate of the signal 200 in dependence on the value B' representing the number of frames per second that the receiving circuitry 1' of the second terminal can process, the value A' representing the frame rate of the reply signal 300 and the value C' reporting the available CPU resource at the second terminal. This will be described with reference to FIG. 5.

Figure 5:
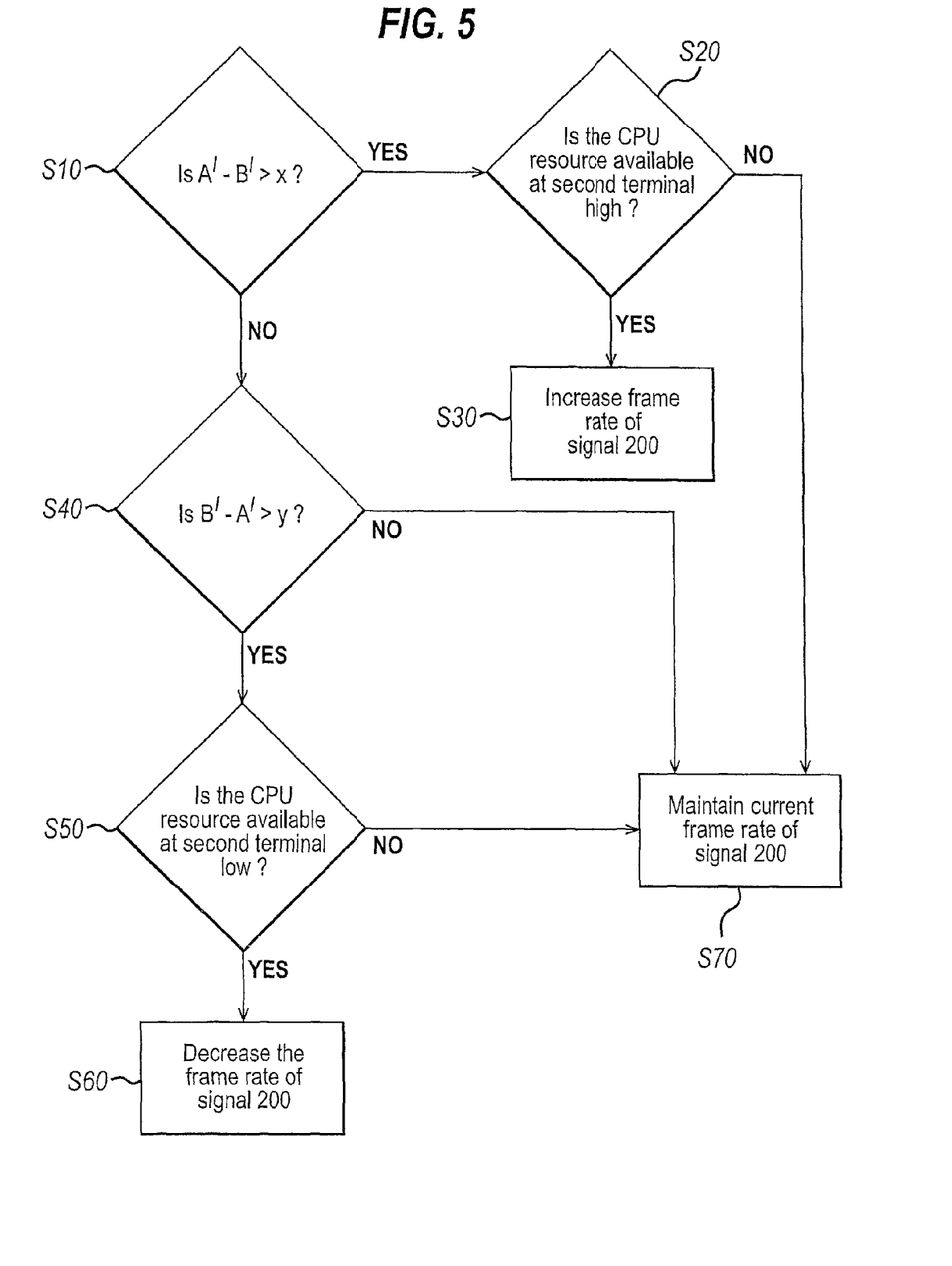
FIG. 5 is a flow chart illustrating a method according to a further embodiment of the present invention.

As shown in FIG. 5, in step S10 it is determined if the value of A' is greater than the value B' by more than a predetermined amount x.

If the value of A' is greater than the value B' by more than the predetermined amount x, the method continues to step S20.

In step 20 it is determined if the value C' indicates that the available CPU resource of the second terminal is high. If it is determined that the available CPU resource of the second terminal is high the method continues to step S30

In step S30 the resource manager 22 of the first terminal is arranged to instruct the encoder 32 to increase the frame rate of the signal 200 transmitted to the second terminal, thus forcing the resource manager 22' of the second terminal 112 to allocate greater CPU resources for processing the signal 200.

If it is determined in step 20 that the available CPU resource of the second terminal is low the method continues to step S70.

If it is determined in step S10 that the value of A' is not greater than the value B' by more than the predetermined amount x, the method continues to step S40.

In step S40 it is determined if the value of B' is greater than the value A' by more than a predetermined amount y.

If the value of B' is not greater than the value A' by more than the predetermined amount y, the method continues to step S70.

If the value of B' is greater than the value A' by more than the predetermined amount y, the method continues to step S50.

In step S50, it is determined if the value C' indicates that the available CPU resource of the second terminal is low. If it is determined that the available CPU resource of the second terminal is low the method continues to step S60

In step S60 the resource manager 22 of the first terminal is arranged to instruct the encoder 32 to decrease the frame rate of the signal 200 transmitted to the second terminal, thus reducing the CPU resources required to process the signal 200 and allowing the resource manager of the second terminal to allocate greater CPU resources to transmitting the reply signal 300.

If in step S50 it is determined that the available CPU resource of the second terminal is high the method continues to step S70.

In step S70 the resource manager 22 of the first terminal is arranged to maintain the current frame rate of the signal 200.

Similarly the resource manager 22 of the first terminal 100 may be arranged to report the available CPU resource of the first terminal to the second terminal. The resource manager 22' of the second terminal may then adjust the frame rate of the reply signal 300 according to the method described with reference to FIG. 5.

In accordance with a further embodiment of the invention, information relating to the display screen 18 used to display the signal 200 may be used together with the characteristics of the reply signal 300 to adjust the frame rate of the signal 200.

Referring again to FIG. 3 the renderer 36' of the second terminal 112 may be arranged to report to the first terminal information relating to the display screen of the second terminal. For example the renderer may report the resolution used to display the video data in the signal 200. Alternatively the renderer may report if the resolution of the display screen is greater or less than a threshold value.

A value D' representing the resolution of the display screen of the second terminal may be encoded and transmitted together with the reply signal 300 to the first terminal.

At the first terminal the value D' representing the resolution of the display screen of the second terminal is input into the resource manager 22 of the first terminal.

In accordance with an embodiment of the invention the resource manager 22 of the first terminal 100 is arranged to adjust the data rate of the signal 200 in dependence on the resolution of the display screen of the second terminal 112. For example, if the resolution of the display screen is high, the resource manager 22 of the first terminal may instruct the encoder 32 of the first terminal to encode the video data with a high resolution. This may be achieved by, for example, reducing the frame rate or increasing the bit rate available to the encoder 32.

The resource manager 22 of the first terminal may use the resolution of the display screen of the second terminal indicated by the value D' in combination with any of the above identified values in order to adjust the characteristics of the signal 200.

In particular, in the case where a fixed bit rate is available to the encoder 32, if it is reported that the resolution of the display screen of the second terminal is above a threshold value the resource manager may prevent the frame rate of the signal 200 from increasing even if the values A' B' or C' indicate that the frame rate should be increased, in order to retain the resolution of each frame. If however it is reported that the resolution of the display screen of the second terminal is below a threshold value the resource manager may allow the frame rate of the signal 200 to increase.

In one embodiment of the invention the signal 200 and the reply signal 300 occur within the same communication event, such as a video call between a user of the first terminal and a user of the second terminal.

In an alternative embodiment of the invention the signal 200 and the reply signal 300 may relate to different communication events. For example the signal 200 may comprise a video signal transmitted during a call and the reply signal 300 may comprise a file transfer.

In a further embodiment of the invention more than two terminals may be arranged to transmit and receive signals to and from each other. For example this may occur during a video conference call as shown in FIG. 6.

Figure 6:
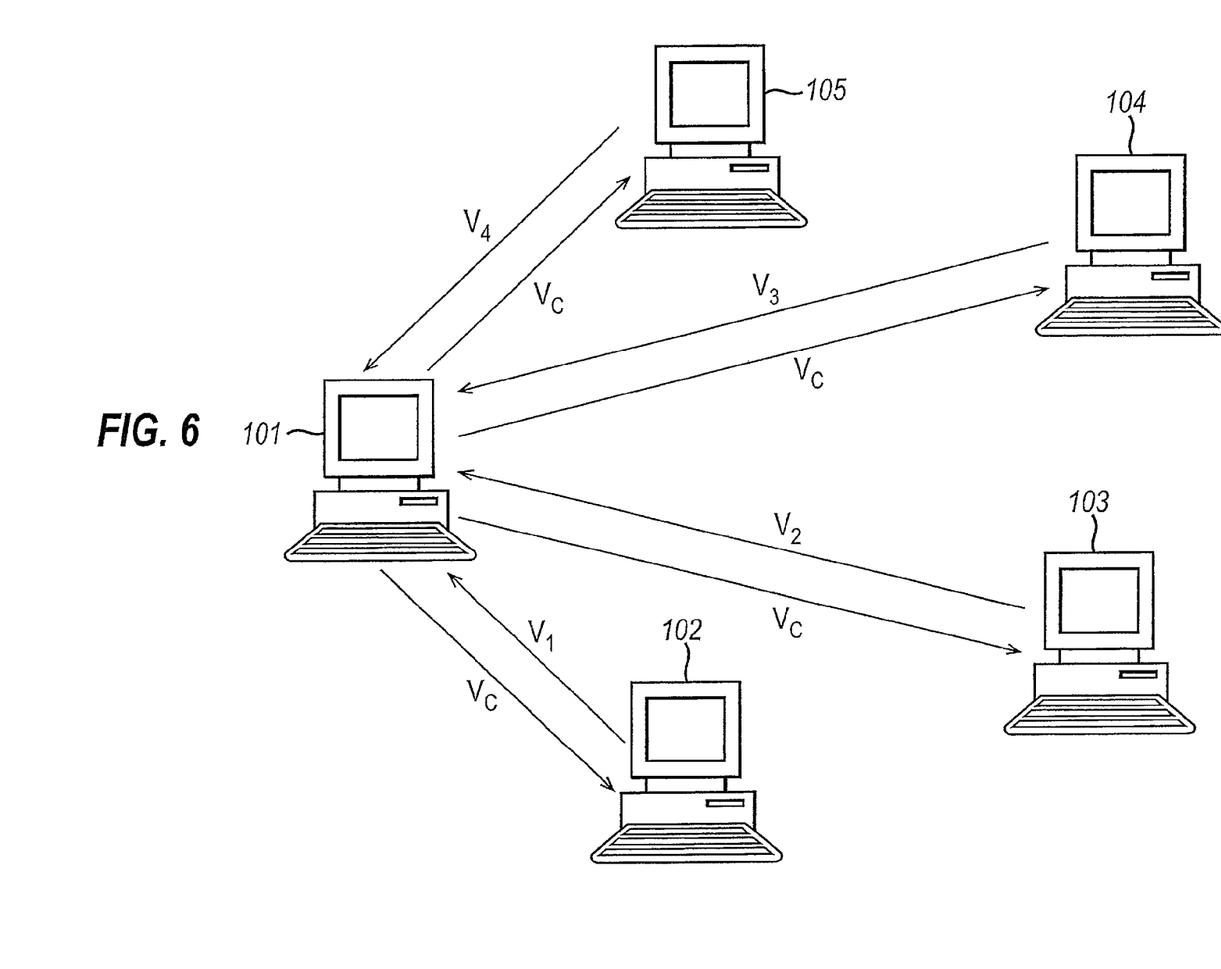
FIG. 6 shows an embodiment in which more than two terminals may be arranged to transmit and receive signals to and from each other during a video conference call.

In FIG. 6 the five terminals 101, 102, 103, 104 and 105 are arranged to communicate in a video conference call. Terminal 101 operates as the host terminal of the conference call. As such, the other terminals participating in the conference call transmit video signals V1, V2, V3 and V4 to the host terminal 101. The host terminal is arranged to combine the video signals and to transmit the combined video signal Vc to each of the other terminals.

In accordance with an embodiment of the invention the host terminal is arranged to estimate the CPU resource of each terminal using characteristics of the video signal received from each terminal. The characteristics of each video signal may be estimated at the host terminal 101 or reported by each of the other terminals participating in the conference call.

The host terminal may then adjust a characteristic of the combined video signal Vc transmitted to each terminal in dependence on the estimated CPU resource for each terminal. The adjustment of the characteristic of the combined video signal may also be based on other conditions reported from the terminals, such as processing delay time and screen resolution as described above.

The host can then send commands to each participant to the conference, that is the host will adjust its own sending quality of combined video streams and also advise to each participant the quality it expects them to send, as opposed to each participant having to make its own decision without necessarily knowing about other participants. The characteristics data may be gathered in one place to allow the decision to be made in one place, so that a request can be made to each participant about the kind of video and quality to send.

It will be appreciated that the characteristic data does not have to be routed along the same path(s) as the video data itself, although generally they will. However, for scenarios where "everyone is sending to everyone" video data could be sent directly to each other. Without gathering characteristic data centrally, this could result in one-to-one optimisations. To improve this, the characteristic data can be sent to one "main" party which decides characteristic data for all participants.

In a further example of the present invention, the resource manager 22' on the second terminal 112 may be configured to determine both (i) the processing resources used at the second terminal 112 to receive the first signal 200 from the first terminal 100, and (ii) the processing resources used at the second terminal 112 to transmit the second signal 300 to the first terminal 100. The first signal 200 may be received at the second terminal 112 during a period which at least partially overlaps in time with the transmission of the second signal 300 from the second terminal 112, or the signals 200 and 300 may otherwise be interdependent. The two signals 200 and 300 are preferably the two complementary incoming and outgoing signals of the same communication event such as the same voice or video call, but could potentially be unrelated in content. The processing resources analysed by the resource manager 22' on the second terminal 112 may comprise a number of CPU cycles incurred per unit and/or other factors such as amount of memory resources or number of registers, threads or cores of the CPU allocated to the task in question. The processing resources incurred at the second terminal 112 in order to receive the first signal 200 may comprise for example the resources required by the decoder 12 to decode the first signal 200 and/or by the renderer 36 to render the first signal 200 for output to a screen. The processing resources incurred at the second terminal 112 in order to transmit the second signal 300 may comprise for example the resources required by the encoder 32 to encode the second signal 300 for transmission over the network 104.

The resource manager 22' on the second terminal 112 is thus configured to determine a processing "cost" of each of the two signals 200 and 300 in terms of the amount of processing resource incurred. In this embodiment, the resource manager 22' on the second terminal 112 is further configured to asses both the processing cost (i) of receiving the first signal 200 and the processing cost (ii) of transmitting the second signal, considered together. That is, the resource manager 22' on the second terminal 112 is configured to determine an overall combined effect of the concurrent or interdependent transmission and receipt, e.g. to compare the processing cost at the second terminal 112 by the two incoming and outgoing signals 200 and 300 at some point in time or over some period of time, so as to obtain some measure of the cost of one signal relative to the other.

The processing cost (i) of receiving the first signal 200 at the second terminal 112 from the first terminal 100 will be related to at least one characteristic of that signal as transmitted from the first terminal 100 such as the first signal's encoded bitrate, frame rate, or frame resolution, or other quality-related property. Similarly, the processing cost (ii) of transmitting the second signal 300 from the second terminal 112 to the first terminal 110 will be related to at least one characteristic of that signal as will be transmitted from the second terminal 112 such as the bitrate at which second signal is to be encoded, or the frame rate or resolution to be used, or other quality-related property.

The resource manager 22' may be configured such that the processing costs are measured directly from the CPU and then mapped to corresponding signal characteristics, or the resource manager 22' may be configured such that the processing cost can be inferred from a current signal characteristic (e.g. it may be a known design feature of a given encoding algorithm that it incurs a certain number of processing cycles).

Either way, based on such information relating to processing cost, the resource manager 22' at the second terminal is configured to formulate decisions regarding both: a characteristic of the second signal 300 as should then be adopted by the second terminal 112 for subsequent transmission to the first terminal 100, and a characteristic of the first signal 200 which it would be desirable for the first terminal 112 to adopt for subsequent transmission to the second terminal 112.

The resource manager 22' and transmitting circuitry of second terminal 112 are configured to then feed back to the first terminal 110 at least the decision regarding the transmission of the first signal 200 from the first terminal 100 to the second terminal 112. The resource manager 22 and receiving circuitry on the first terminal 100 are arranged to receive the feedback of this decision, and the first terminal's resource manager 22 and transmitting circuitry are configured to act on the fed back decision by adjusting the corresponding characteristic or characteristics of the first signal 200 for transmission from the first terminal 100 to the second terminal 112 from that point onwards.

The decision making process is preferably configured to weigh the two costs and/or the corresponding characteristic(s) that would result, and determine a decision which evens out the perceived performance from the perspective of both the user of the first terminal 100 and the user of the second terminal 112. The resource manager 22' on the second terminal 112 may thus be said to have determined a desired balance between the characteristics of the two signals 200 and 300.

For example, suppose the second terminal's resource manager 22' finds that it the second terminal 112 is currently committing a large number of CPU cycles per unit time to receiving a very high bitrate first signal 200 from the first terminal 100 (e.g. due to the processing cost of decoding the high rate signal), leaving the second terminal 112 with only a small number of cycles available to generate the second signal 300 for transmission to the first terminal 100 (e.g. leaving only enough resource to encode a low rate). This may mean that the second terminal 112 is receiving a needlessly burdensome signal whilst the first terminal 100 is only provided with an undesirably low quality signal. In this case the resource manager 22' on the second terminal 112 may determine that it would be preferable for the first terminal 100 to stop sending such a high bitrate signal, and feed back a request indicating such to the first terminal. The resource manager 22 on the first terminal 100 would then act on the request to transmit a reduced bitrate signal (e.g. lower resolution or frame rate or otherwise using an encoding algorithm that applies more compression).

Conversely, the second terminal's resource manager 22' may find that it the second terminal 112 is currently committing a large number of CPU cycles per unit time to encoding a very high bitrate second signal 300 to the first terminal 100, leaving the second terminal 112 with insufficient cycles available to adequately decode the first signal 100 received from the first terminal 100. In this case the resource manager 22' on the second terminal 112 may control itself to decrease the coding rate it is using to transmit the second signal 300 to the first terminal 100 and also instruct the first terminal 100 that it can transmit (or continue transmitting) a medium rate first signal 200.

Thus the invention may achieve a more balanced experience for the users of first and second terminals 110 and 112.

The analysis of both signals and the decision making process being implemented at the second terminal (such that only an indication of the relevant decision need necessarily be fed back to the first terminal 100).

The balancing of the two signals including the feed back from the second terminal 112 to control the first terminal 110 is preferably an ongoing process that is repeated at least once throughout ongoing transmission and receipt of the first and second signals 200 and 300 between the first and second terminals 100 and 112.

In addition to the above, the resource manager 22' may optionally be configured to factor in to the balancing process (iii) the processing resources incurred at the first terminal 100 in transmitting the first signal 200 to the second terminal 112, and/or (iv) the processing resources incurred at the first terminal 100 in receiving the second signal 300. The resources of the first terminal 100 could be determined by the second terminal for example based on an indication of available resources or signal characteristics reported from the first terminal 100 to the second terminal, or on a discretionary request signal from the first terminal 100 to the second terminal 112 (with the second terminal being the master decision maker). Thus the decision as to what is transmitted to the first terminal and what is requested from the first terminal could be additionally made dependence on the CPU resources of the first terminal, e.g. so that the second terminal 112 does not request a first signal having too high a bitrate that the first signal cannot adequately encode it, or to make better use of the first terminal's resources if it has adequate resources to handle a high rate first and/or second signal.

In a conference call scenario this idea may be extended to factor in the effect of varying the second signal 300 on the processing resources of one or more other, third participants of the call who also receive an instance of the second signal from the second terminal 112, e.g. with reports on their respective resources or signal characteristics also being factored in to the equation.

In an alternative implementation, the decision making process itself may be implemented at another, third participant of a conference call or at a server. In these cases, the first and second terminals are each configured to report resources or characteristics to the host or server in question, and the host or server is arranged with its own separate resource manager which performs the balancing process and issues decisions back to both the first and second terminals. The resource managers 22 and 22' on the first and second terminals are then configured to act on the respective decisions from the host or server so as to adjust the relevant signal characteristics accordingly.

In embodiments of the present invention the required processing may be implemented as hardware or by using appropriately adapted software executed on a processor. Software for implementing the invention may be stored on and provided by means of a carrier medium such as a carrier disc, card or tape. A possibility is to download the software via a data network. This is an implementation issue.

It will be appreciated that embodiments of the invention can be applied in different conferencing architectures.

While this invention has been particularly shown and described with reference to preferred embodiments, it will be understood to those skilled in the art that various changes in form and detail may be made without departing from the scope of the invention as defined by the claims.

What is claimed is:

1. A method comprising:
  receiving, at a second terminal, a first signal transmitted from a first terminal via a communication network;
  transmitting a second signal from the second terminal to the first terminal;
  outputting the first signal from an output device associated with the second terminal;
  determining, at the second terminal, a balance between a signal quality of the first signal and a signal quality of the second signal based on processing resources used by the second terminal to transmit the second signal and processing resources used by the second terminal to receive the first signal from the first terminal, the determined balance comprising a decision concerning the signal quality of the first signal; and
  sending the decision from the second terminal to the first terminal to cause the first terminal to adjust the signal quality of the first signal as transmitted from the first terminal.

2. The method of claim 1, wherein the determination of said balance is further based on an estimation of a processing resource of the first terminal used to tansmit the first signal.

3. The method of claim 1, wherein the determination of said balance is further based on an estimation of a processing resource of the first terminal used to receive the second signal.

4. The method of claim 1, wherein the first and second terminals are participants of a conference call comprising the first and second signals, and the determination of said balance is further based on a processing resource of at least one other participating terminal of the conference call used to participate in the conference call.

5. The method of claim 1, wherein the signal quality of the first signal comprises at least one of a frame rate, a bit rate, or a frame resolution.

6. The method of claim 1, wherein the signal quality of the second signal comprises at least one of a frame rate, a bit rate, or a frame resolution.

7. The method of claim 1, wherein the processing resources used by the second terminal to receive the first signal comprises processing resources used to decode the first signal at the second terminal, and the processing resources used by the second terminal to transmit the second signal comprises processing resources used to encode the second signal at the second terminal.

8. The method of claim 1, wherein the first signal is received and the second signal is transmitted as part of a same communication event.

9. The method of claim 8, wherein the first and second signals are part of a voice or video call between the first and second terminals.

10. The method of claim 1, wherein said communication network comprises the internet, the first signal is received by the second terminal from the first terminal via the internet, the second signal is transmitted from the second terminal to the first terminal via the internet, and said decision is sent to the first terminal via the internet.

11. A method comprising:
receiving, at a second terminal, a first signal from a first terminal via a. communication network;
transmitting a second signal from the second terminal to the first terminal;
outputting the first signal from an output device associated with the second terminal;
estimating a. processing resource of the second terminal used to receive the first signal;
estimating a processing resource of the second terniinal used to transmit the second signal; and
determining, at the second terminal, a decision concerning a transmission quality of the first signal based on the estimate of the processing resource used to receive the first signal and the estimate of the processing resource used to transmit the second signal; and
sending the decision from the second terminal to the first terminal to request that the first terminal transmit the first signal with said transmission quality.

12. A second terminal comprising:
receiving circuitry configured to receive a first signal transmitted from a first terminal via a communication network;
transmitting circuitry configured to transmit a second signal from the second terminal to the first terminal;
an output device configured to output the first signal; and
a resource manager configured to determine a balance between a signal quality of the first signal and a signal quality of the second signal based on processing resources used by the second terminal to transmit the second signal and processing resources used by the second terminal to receive the first signal from the first terminal, the determined balance comprising a decision concerning the signal quality of the first signal;
the transmitting circuitry further configured to send the decision to the first terminal to request that the first terminal adjust the signal quality of the first signal as transmitted from the first terminal.

13. The second terminal of claim 12, wherein the resource manager is further configured to determine said balance based on an estimation of a processing resource of the first terminal used to transmit the first signal.

14. The second terminal of claim 12, wherein the resource manager is further configured to determine said balance based on an estimation of a processing resource of the first terminal used to receive the second signal.

15. The second terminal of claim 12, wherein the first and second terminals are participants of a conference call comprising the first and second signals, and the resource manager is further configured to determine said balance based on a processing resource of at least one other participating terminal of the conference call used to participate in the conference call.

16. The second terminal of claim 12, wherein the signal quality of the first signal comprises at least one of a frame rate, a bit rate, or a frame resolution.

17. The second terminal of claim 12, wherein the signal quality of the second signal comprises at least one of: a frame rate, a bit rate, or a frame resolution.

18. The second terminal of claim 12, comprising at least one of:
a decoder configured to decode the first signal received from the first terminal, wherein the processing resources used to receive the first signal comprises processing resources used by the decoder to decode the first signal; and
an encoder configured to encode the second signal for transmission to the first terminal, wherein the processing resources used to transmit the second signal comprises processing resources used by the encoder to encode the second signal.

19. The second terminal of claim 12, wherein the transmitting and receiving circuitry s arranged such that the first signal is received and the second signal is transmitted as part of a same communication event.

20. The second terminal of claim 12, wherein the transmitting and receiving circuitry is arranged such that the first and second signal are part of a voice or video call between the first and second terminals.

21. The second terminal of claim 12, wherein said communication network comprises the internet; and
the transmitting and receiving circuitry is arranged such that the first signal is received by the second terminal from the first terminal via the internet, the second signal is transmitted from the second terminal to the first terminal via the internet, and said decision is sent to the first terminal via the internet.

22. A second terminal comprising:
receiving circuitry configured to receive a first signal from a first terminal via a communication network;
transmitting circuitry configured to transmit a second signal from the second terminal to the first terminal;
an output device configured to output the first signal;
a resource manager configured to estimate a processing resource of the second terminal used to receive the first signal, and to estimate a processing resource of the second terminal used to transmit the second signal;
the resource manager further configured to determine a decision concerning a transmission quality of the first signal based on the estimate of the processing resource used to receive the first signal and the estimate of the processing resource used to transmit the second signal; and
the transmitting circuitry further configured to send the decision to the first terminal to request that the first terminal transmit the first signal with said transmission quality.

23. A computer-readable storage device comprising computer readable instructions stored thereon that, responsive to execution by a computer, perform operations comprising:
receiving, at a second terminal, a first signal transmitted from a first terminal via a communication network;
transmitting a second signal from the second terminal to the first terminal;
outputting the first signal from an output device associated with the second terminal;
determining, at the second terminal, a balance between a signal quality of the first signal and a signal quality of the second signal based on processing resources used by the second terminal to transmit the second signal and processing resources used by the second terminal to receive the first signal from the first terminal, the determined balance comprising a decision concerning the signal quality of the first signal; and sending the decision from the second terminal to the first terminal to cause the first terminal to adjust the signal quality of the first signal as transmitted from the first terminal.

24. The computer-readable storage device of claim 23, wherein determining the balance is further based on an estimation of a processing resource of the first terminal used to transmit the first signal.

25. The computer-readable storage device of claim 23, wherein determining the balance is further based on an estimation of a processing resource of the first terminal used to receive the second signal.

26. The computer-readable storage device of claim 23, wherein the first and second terminals are participants of a conference call comprising the first and second signals, and determining the balance is further based on a processing resource of at least one other participating terminal of the conference call used to participate in the conference call.

27. The computer-readable storage device of claim 23, wherein the signal quality of the first signal comprises at least one of a frame rate, a bit rate, or a frame resolution.

28. The computer-readable storage device of claim 23, wherein the signal quality of the second signal comprises at least one of a frame rate, a bit rate, or a frame resolution.

* * * * *